United States Patent [19]

Horton et al.

[11] Patent Number: 4,511,677
[45] Date of Patent: Apr. 16, 1985

[54] ION EXCHANGE-ACTIVE COMPOSITIONS CONSISTING OF WATER-SOLUBLE POLYELECTROLYTE UPON ION EXCHANGE FUNCTIONAL SUBSTRATE

[75] Inventors: Robert L. Horton, South Russell, Ohio; G. Allan Stahl, Bartlesville, Okla.

[73] Assignee: Phillips Petroleum Company, Bartlesville, Okla.

[21] Appl. No.: 548,051

[22] Filed: Nov. 2, 1983

[51] Int. Cl.³ .................. B01J 39/06; C01G 56/00; C01G 57/00
[52] U.S. Cl. ................................ 521/28; 423/7
[58] Field of Search ............... 521/28, 38; 423/3, 6, 423/7

[56] References Cited

U.S. PATENT DOCUMENTS

| | | | |
|---|---|---|---|
| 2,591,574 | 4/1952 | McBurney | 269/89.7 |
| 2,629,710 | 2/1953 | McBurney | 260/88.1 |
| 2,635,061 | 4/1953 | McBurney | 127/46 |
| 2,883,356 | 4/1959 | Gluesenkamp | 521/28 |
| 3,546,142 | 12/1970 | Michaels et al. | 521/28 |
| 3,886,080 | 5/1975 | Schucker et al. | 252/176 |
| 4,024,216 | 5/1977 | Finch et al. | 423/7 |
| 4,200,695 | 4/1980 | Chong et al. | 521/28 |
| 4,239,615 | 2/1980 | Tu | 208/120 |
| 4,339,414 | 7/1982 | Moore | 423/7 |
| 4,351,909 | 9/1982 | Stevens | 521/28 |

OTHER PUBLICATIONS

"Encyclopedia of Chemical Technology," Kirk Othmer, 3rd edition, vol. 13, pp. 678, 688–689, 1981.
"I&EC Product Research and Development", vol. 3, #2, pp. 85–89, Jun. 1964.

Primary Examiner—Joseph L. Schofer
Assistant Examiner—Peter F. Kulkosky
Attorney, Agent, or Firm—L. M. Lavin

[57] ABSTRACT

A new class of ion exchange agents comprises water soluble polymers called polyelectrolytes sorbed onto ion exchange functional substrates.

5 Claims, No Drawings

ION EXCHANGE-ACTIVE COMPOSITIONS CONSISTING OF WATER-SOLUBLE POLYELECTROLYTE UPON ION EXCHANGE FUNCTIONAL SUBSTRATE

This invention relates to a new class of ion exchange compositions. In one aspect it relates to the preparation of a new class of ion exchange compositions. In another aspect the invention relates to a new class of ion exchange compositions comprising composites of water soluble polymers called polyelectrolytes and a substrate.

Ionic exchange is the reversible interchange of ions between a solid and a liquid in which there is no permanent change in the structure of the solid which is the ion exchange material. Ion exchange is used in water softening and deionization. It also provides a method of separation that is used in many useful chemical processes and analyses. It has special utility in chemical synthesis, medical research, food processing, mining, agriculture, and a variety of other areas. Ion exchange has been used on an industrial basis since the introduction of water softening through natural and later synthetic zeolites.

Most ion exchange resins today are synthetic. They are made totally from petroleum chemicals. One problem these resins have is that in order to be used, the ions to be exchanged must move from the exchanging fluid into the resin, past networks of intertwined and cross-linked polymer chains which often have a distinct hydrophobicity.

Once the ions have migrated to the interior of the resin beads, they replace other ions in the beads (hence ion exchange). These other ions are often of different radii than their replacement, causing the resin beads to shrink or swell during use. This change in bead size can cause plugging of the resin bed if the beads get too large. It can also cause some of the resin to be washed out of the bed with the fluid if the beads get too small.

Another problem common in large scale operations is the low density of synthetic resin beads. Often an upward flow is used in these operations and small size beads are unable to remain in the bed and are carried out with the fluid. Therefore these processes are limited to large beads, which limits the processes capacity and kinetics.

The instant invention is a composite ion exchange resin which comprises low-cost substrate materials. The composite will have the material strength and temperature stability of the substrate. The ion exchange sites are all at the surface of the substrate or along the length of the polyelectrolyte which extends out into the exchanging fluid. The problem of shrinking and swelling can be eliminated by the use of a substrate that is not subjected to shrinking or swelling. Since the exchange sites are all on the outside of the material, the ions will not have to migrate to the interior. Also the composites can be relatively dense, simply by choosing a dense substrate. Additionally the substrate can also be magnetic or magnetically permeable so that magnetic ion exchange bed confinement can be employed.

Therefore, an object of this invention is to produce a new class of ion exchange agents. Another object of this invention is to produce an ion exchange composite resin of low cost, of high strength, and of better temperature stability than conventional ion exchange resins. Still another object is to provide ion exchange resin where the exchange sites are in a more hydrophilic environment. Another object of this invention is to provide ion exchange composite resins that do not shrink or swell on loading or regeneration. Another object of this invention is to provide an ion exchange composite that can be dense, magnetic or magnetically permeable. Other objects of the invention will become clear from the following description.

STATEMENT OF THE INVENTION

The instant invention is a new class of ion exchange compounds comprising a water soluble polymer having multiple ionic functional groups and an ion exchange functional substrate.

In another embodiment this invention is a method of preparing an ion exchange compound comprising a water soluble polymer and an ion exchange functional substrate.

DETAILED DESCRIPTION OF THE INVENTION

A polyelectrolyte is a natural or synthetic polymer substance containing either ionic or cationic functional groups. The polyelectrolytes of the instant invention can be chosen from any polyelectrolytes of linear or cross-linked configuration. The polyelectrolytes that are linear or only slightly cross-linked are preferred. Linear polyelectrolytes are most preferred.

The molecular weight range of the polymers useful in accordance with this invention is from 2 to 15 million daltons. In general, the molecular weight will range from about 1,000 to 15 million daltons. In the most preferred embodiment of this invention, molecular weight will range from 20,000 to 15 million daltons.

Any material of organic or inorganic composition which has a surface charge and which can be utilized as a substrate onto which polyelectrolytes can adhere can be used. The substrate holds the polymers immobilized while the solution containing valuable ions elutes through the composite. The class of substrate has been shown to include any material having an inherent ion exchange capacity. Preferred substrate materials include clays, zeolites, minerals, charcoals, carbon black and any conventional ion exchange resin.

The substrate material should be cleaned thoroughly with water or any other suitable material to dislodge any foreign material or fines which may have adhered to the surfaces. Next, an optional surface pretreatment step may be carried out. This step can involve acidization of a mineral substrate surface, or ion exchanging cations like protons or barium ions or anions like hydroxide ions onto the substrate. If the substrate used is carbon black the carbon black can be carbonylated by oxidizing it with ozone, nitric acid, nitrogen oxides or hydrogen peroxide.

The substrate and the polymer solution can be combined in any conventional manner, under any suitable conditions. The preferable step is to treat the substrate with the polyelectrolyte using an aqueous solution of the polyelectrolyte. This process is carried out with the polymer in an aqueous solution with a concentration of polymer ranging from about 0.0000001 to about 10% by weight, based on the weight of the solution, preferably in a reasonably dilute solution within that range.

The polymer can also be applied in a solution in which other organic or inorganic salts such as ammonium citrate, sodium benzoate, sodium sulfate, tributylammonium chloride, etc., are dissolved. In the case of the application of a mixed polyelectrolyte such as poly- (sodium acrylate-co-N-acrylamidomethyl-trimethylammonium chloride) it is preferable to have such salts also dissolved in the solution being applied to the substrate.

The process of treating the substrate with the polyelectrolyte can be any of several conventional processes. The solution of polyelectrolyte can be applied to the substrate in a batch fashion or by packing the substrate into a column and eluting the solution through the column of substrate. Neither method is to be preferred over the other in those cases in which the polyelectrolyte is truly chemisorbed onto the substrate. When the polymer is less strongly bonded to the substrate, it is preferable to apply the polymer solution to the substrate in an upflowing fashion in a column packed with substrate.

After the polymer solution has been applied to the substrate, the composite may be used as is, although it should preferably be washed thoroughly with water or other suitable material. Whether washed or not, the composite can be dried for storage, shipping, and/or use. It is preferable, however, to keep the composite moist up through the time of usage.

Any polyelectrolyte can be used in the present invention. The preferred polyelectrolytes are of the group comprising (a) polymers of quaternary halide salts of amines, (b) polymers of (1) the sodium salts of acrylic acids, (2) the sodium salts of sulfonic acids containing a vinyl group or the respective acids of (1) and (2) and copolymers of monomer precursors of (a) and (b). The following list of polymers is meant only to be illustrative and in no way is it to be construed that they make up all possible possible polymers usable in accordance with the invention:

CATIONIC POLYELECTROLYTES poly-(azirinium halides),
poly-(vinyltropylium halides)
poly-(azirinium-co-vinyltropylium halides),
poly-(styrene-co-aziriniun halides),
poly-(styrene-co-vinyltropylium halides),
poly-(N-acrylamidomethyl-trimethylammonium halides),
poly-(N-acrylamidomethyl-trimethylphosphonium halides),
poly-(N-acrylamidomethyl-trimethylarsonium halides),
poly-(N-acrylamidomethyl-dimethylsulfonium halides),
poly-(N-acrylamidomethyl-dimethylselenonium halides),
poly-(N,N-dimethyl-3,5-dimethylene piperidinium halides),
poly-(allyltrimethylammonium halides),
poly-(styrene-co-allytrimethylammonium halides),
poly-(diallyldimethylammonium halides),
poly-(vinylbenzyl trimethylammonium halides),
poly-(vinylbenzyl trimethylphosphonium halides),
poly-(vinylbenzyl trimethylarsonium halides),
poly-(vinylbenzyl dimethylsulfonium halides),
poly-(methyl vinylpyridinium halides),
poly-(methyl vinylpridinium-co-allyltrimethylammonium halides),
poly-(methyl vinylphosphorinaninium halides),
poly-(methyl furaninium halides),

ANIONIC POLYELECTROLYTES poly-(acrylic acid),
poly-(acrylic acid-co-acrylamide),
poly-(acrylic acid-co-styrene),
poly-(styrene sulfonic acid),
poly-(acrylic acid-co-styrene sulfonic acid),
poly-(vinylsulfonic acid),
poly-(methacrylic acid),
poly-(vinyl phosphonic acid),
poly-(chloracrylic acid),
poly-(bromoacrylic acid),
poly-(vinylbenzoic acid),
poly-(vinylbutylsufonic acid),
poly-(sodium acrylate),
poly-(sodium acrylate-co-styrene),
poly-(sodium acrylate-co-acrylamide),
poly-(sodium styrene sulfonate),
poly-(sodium methacrylate),
poly-(sodium vinyl phosphonate),
poly-(sodium chloracrylate),
poly-(sodium bromoacrylate),
poly-(sodium vinylbenzoate),
poly-(sodium vinylbutylsulfonate),
poly-(sodium tetrastyrylboride),
poly-(sodium vinylbenzyl triphenylboride)

MIXED POLYELECTROLYTES poly-(acrylic acid-co-azirinium halides),
poly-(acrylic acid-co-N-acrylamidomethyl-trimethylammonium halides),
poly-(acrylic acid-co-N,N-dimethyl-3,5-dimethylene piperidinium halides),
poly-(acrylic acid-co-allyltrimethylammonium halides),
poly-(acrylic acid-co-diallyldimethylammonium halides),
poly-(acrylic acid-co-vinylbenzyl trimethylammonium halides),
poly-(acrylic acid-co-methyl vinylpyridinium halides),
poly-(styrene sulfonic acid-co-azirinium halides),
poly-(styrene sulfonic acid-co-N-acrylamidomethyl-trimethyl ammonium halides),
poly-(styrene sulfonic acid-co-N,N-dimethyl-3,5-dimethylene piperidinium halides),
poly-(styrene sulfonic acid-co-allyltrimethylammonium halides),
poly-(styrene sulfonic acid-co-diallyldimethylammonium halides),
poly-(styrene sulfonic acid-co-vinylbenzyl trimethylammonium halides),
poly-(styrene sulfonic acid-co-methyl vinylpyridinium halides),
poly-(vinylsulfonic acid-co-azirinium halides),
poly-(poly-vinylsulfonic acid-co-N-acrylamidomethyl-trimethylammonium halides),
poly-(vinylsulfonic acid-co-N,N-dimethyl-3,5-dimethylene piperidinium halides),
poly-(vinylsulfonic acid-co-allyltrimethylammonium halides),
poly-(vinylsulfonic acid-co-diallyldimethylammonium halides),
poly-(vinylsulfonic acid-co-vinylbenzyl trimethylammonium halides),
poly-(vinylsulfonic acid-co-methyl vinylpyridinium halides),
poly-(methacrylic acid-co-azirinium halides),
poly-(methacrylic acid-co-N-acrylamidomethyl-trimethylammonium halides),
poly-(methacrylic acid-co-N,N-dimethyl-3,5-dimethylene piperidinium halides),
poly-(methacrylic acid-co-allyltrimethylammonium halides),
poly-(methacrylic acid-co-diallyldimethylammonium halides), poly-(methacrylic acid-co-vinylbenzyl trimethylammonium halides),
poly-(methacrylic acid-co-methyl vinylpyridinium halides),
poly-(sodium acrylate-co-azirinium halides),
poly-(sodium acrylate-co-N-acrylamidomethyl-trimethylammonium halides),
poly-(sodium acrylate-co-N,N-dimethyl-3,5-dimethylene piperidinium halides),
poly-(sodium acrylate-co-allyltrimethylammonium halides),
poly-(sodium acrylate-co-diallydimethylammonium halides),
poly-(sodium acrylate-co-vinylbenzyl trimethylammonium halides),
poly-(sodium acrylate-co-methyl vinylpyridinium halides),
poly-(sodium styrene sulfonate-co-azirinium halides),
poly-(sodium styrene sulfonate-co-N-acrylamidomethyl-trimethylammonium halides),
poly-(sodium styrene sulfonate-co-N,N-dimethyl-3,5-dimethylene piperidinium halides),
poly-(sodium styrene sulfonate-co-allyltrimethylammonium halides),
poly-(sodium styrene sulfonate-co-diallyldimethylammonium halides),
poly-(sodium styrene sulfonate-co-vinylbenzyl trimethylammonium halides),
poly-(sodium styrene sulfonate-co-methyl vinylpyridinium halides),
poly-(sodium vinylsulfonate-co-azirinium halides),
poly-(sodium vinylsulfonate-co-N-acrylamidomethyl-trimethylammonium halides),
poly-(sodium vinylsulfonate-co-N,N-dimethyl-3,5-dimethylene piperidinium halides),
poly-(sodium vinylsulfonate-co-allyltrimethylammonium halides),
poly-(sodium vinylsulfonate-co-diallyldimethylammonium halides),
poly-(sodium vinylsulfonate-co-vinylbenzyl trimethylammonium halides),
poly-(sodium vinylsulfonate-co-methyl vinylpyridinium halides),
poly-(sodium methacrylate-co-azirinium halides),
poly-(sodium methacrylate-co-N-acrylamidomethyl-trimethylammonium halides),
poly-(sodium methacrylate-co-N,N-dimethyl-3,5-dimethylene piperidinium halides),
poly-(sodium methacrylate-co-allyltrimethylammonium halides),
poly-(sodium methacrylate-co-diallyldimethylammonium halides),
poly-(sodium methacrylate-co-vinylbenzyl trimethylammonium halides),
poly-(sodium methacrylate-co-methyl vinylpyridinium halides),

MOST PREFERRED CATIONIC POLYELECTROLYTES poly-(N-acrylamidomethyl-trimethylammonium chloride),
poly-(N,N-dimethyl-3,5-dimethylene piperidinium chloride),
poly-(allyltrimethylammonium chloride),
poly-(diallyldimethylammonium chloride),
poly-(vinylbenzyl trimethylammonium chloride),
poly-(methyl vinylpyridinium chloride),

MOST PREFERRED ANIONIC POLYELECTROLYTES poly-(acrylic acid),
poly-(styrene sulfonic acid),
poly-(vinylsulfonic acid),
poly-(methacrylic acid),
poly-(sodium acrylate),
poly-(sodium styrene sulfonate),
poly-(sodium vinylsulfonate),
poly-(sodium methacrylate),

MOST PREFERRED MIXED POLYELECTROLYTES poly-(sodium acrylate-co-N-acrylamidomethyl-trimethylammonium chloride),
poly-(sodium acrylate-co-N,N-dimethyl-3,5-dimethylene piperidinium chloride),
poly-(sodium acrylate-co-allyltrimethylammonium chloride),
poly-(sodium acrylate-co-diallyldimethylammonium chloride),
poly-(sodium acrylate-co-vinylbenzyl trimethylammonium chloride),
poly-(sodium acrylate-co-methyl vinylpyridinium chloride),
poly-(sodium styrene sulfonate-co-N-acrylamidomethyl-trimethylammonium chloride),
poly-(sodium styrene sulfonate-co-N,N-dimethyl-3,5-dimethylene piperidinium chloride),
poly-(sodium styrene sulfonate-co-allyltrimethylammonium chloride),
poly-(sodium styrene sulfonate-co-diallyldimethylammonium chloride),
poly-(sodium styrene sulfonate-co-vinylbenzyl trimethylammonium chloride),
poly-(sodium styrene sulfonate-co-methyl vinylpyridinium halides).

The following examples further describe this invention but are not intended to limit the invention.

EXAMPLES

It is well known that clays generally have some ion exchange capacity. Indeed, many of the most important ion exchange adsorbents used in industry are clays—for example, zeolites, mordenite and Fuller's earth. In the course of leaching uranium ore fines (<30 mesh) from a New Mexico ore, conventional acid leaching under relatively harsh conditions reduced the uranium content (as $U_3O_8$) from 0.445 to only 0.137 weight percent. Under the assumption that the uranium might be held to the clay matrix of the fines by ion exchange trapping, another sample of the ore fines was first treated with Cla-sta, a commercial cationic polyelectrolyte marketed by Haliburton Co., and acid leached as before but with surprising results. Rather than an improvement in uranium extraction, the treatment had the opposite effect—uranium content was reduced from 0.445 to 0.398 percent, just over 10 percent leached. Thus, it appeared that cation exchange capacity of the ore for uranium had been enhanced. This observation then led to the invention that the ion exchange capacity of solids with limited capacity can be enhanced by treatment with suitable linear polymers having multiple functional groups.

In carrying out the laboratory experiments (see table) to demonstrate the utility of the invention, the solids to be treated were slurried with water into which the treating agents had been dissolved. Agitation at room temperature continued for 30 minutes after which the sample was washed, filtered and the filter cake or portions thereof similarly contacted for either further treatment or retesting for ion exchange capacity. In the experiments involving Nuchar charcoal, the agitation period was one hour, and in the runs with zeolite the agitation period was about 18 hours.

treated ore exhibited low capacity for polysulfide with only 0.097% in the cake.

A second sample of barren uranium ore fines designated 2-4-5 was treated with the anionic polyelectrolyte PAA plus caustic in Run F and analyzed for Cu and Fe. In Run G, it is demonstrated that such treated ore does not trap sulfonate (<0.01% S). Run H was made to test the ability of the PAA-treated ore to pick up ferric ions.

TABLE

| Run No. | Sample Designation | Sample Weight (g) | Reagents | Filter Cake Designation | Cake Analysis Weight % |
|---|---|---|---|---|---|
| | | | Barren Uranium Ore Fines | | |
| A | 4-1 (see note) | 200 | 200 g. $H_2O$, 4 g Cla-sta, (see note) 24 g. $(NH_4)_2SO_4$ | 4-2 | <0.01 S |
| B | 4-2 | 10 | 20 g $H_2O$, 2 g DDBS (see note) | 4-3 | 0.24 S |
| C | 4-2 | 10 | 10 g. 1 M $Na_2S_4$ | 4-6 | 0.38 S |
| D | 4-1 | 10 | 20 g. $H_2O$, 2 g. DDBS | 4-7 | 0.054 S |
| E | 4-1 | 10 | 10 g. 1 M $Na_2S_4$ | 4-9 | 0.097 S |
| F | 2-4-5 (see note) | 100 | 100 g. $H_2O$, 3 g., PAA, 2 g. NaOH | 5-2 | <0.003 Cu 0.873 Fe |
| G | 5-2 | 10 | 20 g. $H_2O$, 2 g. DDBS | 4-8 | <0.01 S |
| H | 5-2 | 20 | 20 g. $H_2O$, 2 g. $Fe_2(SO_4)_3$ | 5-3 | <0.003 Cu 1.020 Fe |
| I | 5-2 | 20 | 20 g. $H_2O$, 2 g. $CuSO_4$ | 5-4 | 0.299 Cu 0.741 Fe |
| J | 4-4 (see note) | 20 | 20 g. $H_2O$, 2 g. $CuSO_4$ | 5-5 | 0.100 Cu 0.744 Fe |
| K | 2-4-5 | 20 | 20 g. $H_2O$, 2 g. $CuSO_4$ | 5-7 | 0.0676 Cu |
| | | | Nuchar-Charcoal Solids | | |
| L | 8-1 | | None | | <0.02 Cl <0.003 Cu |
| M | 8-1 | 1 | 100 g. $H_2O$, 2 g. $NH_4Cl$ | 8-2 | <0.30 Cl |
| N | 8-1 | 2 | 100 g. $H_2O$, 4 g. PAA, 4 g. NaOH | 8-3 | <0.02 Cl |
| O | 8-3 | 1 | 100 g. $H_2O$, 2 g. $NH_4Cl$ | 8-4 | <0.01 Cl |
| P | 8-3 | 1 | 100 g. $H_2O$, 2 g. $CuSO_4$ | 8-5 | 0.657 Cu |
| | | | Na—Y—Zeolite Solids | | |
| Q | 13-1 (see note) | 30 | 300 g. $H_2O$, 30 g. $K_3Fe(CN)_6$, plus 250 g. $H_2O$, 30 g. $K_3Fe(CN)_6$ | 13-3A | 8.98 Fe 52.85 org. C |
| R | 13-0 (see note) | 133.87 | 500 g. $H_2O$, 69.17 g sample 13-1 | 13-2 | 0.065 Fe 0.747 org. C |
| S | 13-2 | 30 | 300 g. $H_2O$, 30 g. $K_3Fe(CN)_6$, plus 250 g. $H_2O$, 30 g. $K_3Fe(CN)_6$ | 13-3 | 0.076 Fe 0.240 org. C |
| T | 13-2 | 30 | 300 g. $H_2O$, 30 g. NaBr, plus 250 g. $H_2O$, 30 g. NaBr | 13-4 | 0.006 Br |
| U | 13-2 | 30 | 300 g. $H_2O$, 30 g. NaI, plus 250 g. $H_2O$, 30 g. NaI | 13-5 | 0.11 I |
| V | 13-2 | 30 | 300 g. $H_2O$, 30 g. $NaB(C_6H_5)_4$, plus 250 g. $H_2O$, 30 g. $NaB(C_6H_5)_4$ | 13-6 | 27.54 org. C |

Footnotes to Table
Samples 4-1 and 2-4-5 are two different batches of barren uranium ore fines (>30 mesh).
Sample 4-4 is a portion of sample 4-1 which had been treated with PAA. While it was not analyzed for Cu, it can be assumed to be free of Cu.
Sample 8-1 is Nuchar, grade WV-W charcoal distributed by West Virginia Pulp and Paper, Chem. Div
Cla-sta is a cationic polyelectrolyte of proprietary composition distributed by Halliburton Co
DDBS is dodecylbenzenesulfonate, the sodium salt.
PAA is polyacrylic acid (MW 2000), available in 65 percent solution, neutralized to the sodium salt.
Sample 13-0 is sodium-y-zeolite
Sample 13-1 is poly-(N,N—dimethyl-3,5-dimethylenepiperidinium chloride), 21.6% Cl.

Comments on the Table

Run A demonstrates that treatment of barren ore with Cla-sta and ammonium sulfate adds essentially no sulfur to the ore, but in Run B the Cla-sta treated ore trapped DDBS as indicated by the cake analysis of 0.24% S. This result contrasts with Run D wherein barren ore treated with DDBS retained only 0.054% S.

The results of Run C demonstrate the ability of the Cla-sta treated ore to retain polysulfide with a cake analysis of 0.38% S, whereas in control Run E the un- While there was some increase, this may not be too significant since the ore was already rich in iron. In Run I, however, the same PAA-treated ore was tested with cupric sulfate and significant retention of copper was demonstrated with 0.299% Cu versus near zero in the starting adsorbant. The corresponding barren ore adsorbed only 0.0676% Cu in Run K. In Run J another ore sample which had been treated with the acrylate anionic polyelectrolyte exhibited good retention of Cu (0.100%). Run K is a control demonstrating that the barren ore used in Runs F, G, H and I has little affinity for Cu.

Run L simply shows that Nuchar contains essentially no Cl or Cu, and Run M demonstrates that the charcoal has some capacity for chloride ion. In Run N the charcoal was treated with the anionic acrylate polymer and Run O indicates that such treatment eliminates the ability of the charcoal to absorb chloride. Run P, however, shows that the treated charcoal has good capacity for Cu cations.

Runs Q through V demonstrate that poly(N,N-dimethyl-3,5-dimethylenepiperidinium chloride) has high affinity for ferricyanide anion (Run Q), but this capacity is largely lost when the polymer is composited with Na-Y-zeolite (Runs R and S). The composite has no affinity for bromide (Run T), but high capacity for iodide (Run U) and tetraphenylboride anion (Run V).

I claim:

1. An ion exchange process comprising the use of an ion exchange compound comprising a water soluble polymer having multiple ionic functional groups and an ion exchange functional substrate which is at least one of a clay, uranium ore, zeolite, mineral, charcoal or carbon black.

2. An ion exchange process of claim 1 where said water soluble polymer is at least one of
   (a) polymers of quaternary halide salts of amines,
   (b) polymers of (1) the sodium salts of acrylic acids, (2) the sodium salts of sulfonic acids containing a vinyl group, or the respective acids of (1) or (2), or
   (c) copolymers of monomer precursors of (a) and (b).

3. An ion exchange process of claim 2 wherein said group (a) polymers are chosen from poly(N-acrylamidomethyl-trimethylammonium chloride), poly(N,N-dimethyl-3,5-dimethylene piperidinium chloride), poly(allyltrimethylammonium chloride), poly(diallydimethylammonium chloride), poly(vinylbenzyl trimethylammonium chloride) and poly(methyl vinylpyridinium chloride).

4. An ion exchange process of claim 2 wherein said group (b) polymers are chosen from poly(acrylic acid), poly(styrene sulfonic acid), poly(vinyl sulfonic acid, poly(methacrylic acid), poly(sodium acrylate), poly(sodium styrene sulfonate), poly(sodium vinylsulfonate) and poly(sodium methacrylate).

5. An ion exchange process of claim 2 wherein said group (c) polymers are chosen from poly(sodium acrylate-co-N-acrylamidomethyl-trimethylammonium chloride), poly(sodium acrylate-co-N,N-dimethyl-3,5-dimethylene piperidinium chloride), poly(sodium acrylate-co-allytrimethylammonium chloride), poly(sodium acrylate-co-diallydimethylammonium chloride), poly(sodium acrylate-co-vinylbenzyl trimethylammonium chloride), poly(sodium acrylate-co-methylvinylpyridinium chloride), poly(sodium styrene sulfonate-co-N-acrylamidomethyl-trimethylammonium chloride), poly(sodium styrene sulfonate-co-N,N-dimethyl-3,5-dimethylene piperidinium chloride), poly(sodium styrene sulfonate-co-allytrimethylammonium chloride), poly(sodium styrene sulfonate-co-diallydimethylammonium chloride), poly(sodium styrene sulfonate-co-vinylbenzyl trimethylammonium chloride), and poly(sodium styrene sulfonate-co-methyl vinylpyridinium halides).

* * * * *